Patented May 17, 1949

2,470,136

UNITED STATES PATENT OFFICE 2,470,136

COMPOSITION FOR TREATING METALLIC WEAR SURFACES

Harry M. Bramberry, New Castle, Ind.

No Drawing. Application September 22, 1944, Serial No. 555,378

2 Claims. (Cl. 148—6.15)

This invention relates to the treatment of metallic surfaces subject to frictional wear including particularly internal combustion and other compression engine cylinders, pistons and piston rings in order to improve the operating characteristics thereof. More particularly, the invention relates to a novel composition or compound for treating such surfaces in order to establish compatibility of the wear surfaces and effect optimum load carrying characteristics thereof.

One of the objects of the present invention is to provide a novel composition for application to metallic wear surfaces of cylinders, for example, which forms a thin, continuous coating on such surfaces, and which greatly facilitates and lessens the green or run-in period of engines equipped with cylinders so treated.

A further object comprehends the provision of a novel metal treating composition which is effective to produce on wearing surfaces of the above character, a thin film of fine graphite particles, tenaciously bonded to such surfaces, which film materially lessens the possibility of lubrication failures.

Another object is to provide a composition of the foregoing character which includes a graphitic emulsion including a binder and phosphoric acid, the application of the composition to the wear surfaces serving to form a firm phosphate bond of the metal of such surface, whereby the graphitic particles are in effect, cemented to the surface.

A further object resides in the provision of a composition of the above type which includes phosphoric acid and graphite, the acid reacting with the metal of the wear surface to form a phosphate of such metal, which not only tenaciously bonds the graphite to the surface in the form of a thin, continuous film but also forms a polishing agent which greatly reduces the run-in or break-in period of an engine and secures optimum compatibility between piston rings and cylinder in a minimum of time.

Other objects and novel features of my invention will appear more fully hereinafter from a consideration of the detailed description which follows.

A composition for treating metal wear surfaces and particularly the ring-engaging surfaces of cylinders of internal combustion and other compression engines, which I have found unusually effective, comprises a graphitic emulsion containing phosphoric acid. A representative example of the preparation of such a composition is given below, the formula outlined being sufficient to prepare one gallon of the material, which is a water in oil emulsion.

| Material | Pounds | Per Cent by Weight |
|---|---|---|
| Binder | .685 | 7.78 |
| Ortho-phosphoric acid (75%) | 1.088 | 12.35 |
| Finely divided graphite | 1.565 | 17.75 |
| Solvents for binder | 3.27 | 37.09 |
| Emulsifier | .175 | 1.97 |
| Water | 2.033 | 23.06 |
|  | 8.816 | 100.00 |

The solvents employed in the above formula comprised the following, in the ratios noted.

| Material | Pounds |
|---|---|
| Xylol | 2.760 |
| High flash solvent naphtha | .510 |
|  | 3.27 |

In preparing the composition according to the above formula, the entire amount of binder was dissolved in an equal weight of xylol, this resulting in a 50% solids solution. To this solution was added a graphite dispersion which comprised the entire amount of graphite with an equal weight of xylol. This dispersion was thus also a 50% solids product and the combination of the binder solution and graphite dispersion is what is termed the oil phase of the emulsion.

Thereafter, the water phase of the emulsion was obtained by adding the emulsifier and water to the phosphoric acid. Then the oil and water phases were mixed with violent agitation and the resultant emulsion thinned to spraying viscosity with the high flash solvent naphtha and the remainder of the xylol. If desired the resultant compound may be filtered or otherwise treated to remove any undesirable agglomerates and to secure a product with the necessary degree of fineness.

In the above formula, the binder is preferably a resin and may be of the class of petroleum or vegetable residue pitches, it being understood, however, that any suitable binder may be employed. The binder used is preferably water insoluble, should be such as to have a good cohesive or cementing action with the graphite, and should be one which does not completely volatilize at the high temperatures of the order of 400° to 600° F. which may be employed in the process to hasten the action of the composition.

The physical characteristics of the binder are preferably as follows

1. Softening point from 155° to 170° F.
2. Penetration from 25 to 35.
3. Stormer Viscosity at 360° F. of from 30 to 60 R. P. M.

With respect to the acid employed, this is preferably ortho-phosphoric. Other phosphoric acids have been investigated, but were not found as satisfactory as orthophosphoric acid. In the formula, the acid has been noted as being of a strength of 75% phosphoric acid. In the event the strength is of a greater order, it will be understood that the water content is correspondingly changed, but that the same ratios are maintained.

The graphite utilized may be natural or synthetic, of high quality and preferably of extremely small particle size. It is preferred to use colloidal graphite or at least particles approaching the fineness of colloidal size.

The solvents employed are given by way of example only, since they may be any suitable solvent which will dissolve the binder used.

The emulsifying agent employed must be suitable to emulsify water in oil or oil in water. The agent may be of either the cationic or nonionic classes. In the specific formula given, the emulsifier used was a substituted polyglycoletheralcohol, an emulsifier of the nonionic type. For a list of typical nonionic surface active agents reference is made to an article by Henry A. Goldsmith in Chemical Industries, vol. LII, No. 3, March, 1943. Under this general classification come certain polyglycoletheralcohols. Certain of these are referred to in U. S. Patent No. 2,213,477 to Steindorff et al. Examples are dodecylcyclohexylpolyglycolether and isododecylphenylpolyglycolether. The type of substituent which is useful in producing such wetting agents is known in the art and forms no part of the present invention. Generally speaking, such substituents have more than eight carbon atoms. However, if desired, the emulsifier may be of the cationic type, such as an amine-amide, for example. Cation active emulsifying agents are well-known in the art at the present time and form no part of the invention. Cation active emulsifying agents generally consist of one of the following three types:

A. Amines of long chain aliphatic hydrocarbons, saturated or unsaturated. Examples are oleyl amine and lauryl amine.
B. Amine amides of long chain fatty acids. An example is N-amino-ethyldodecylamide.
C. Ester amides of long chain fatty acids. An example is beta (dibetahydroxyethylamino) ethyloleate.

While the foregoing outlines one method of making my improved composition, with certain specific amounts and percentages of materials, I have found that certain of the proportions may be varied within limits, and will yield excellent results.

For example, I have found that I may vary the ratio by weight of graphite to binder to from 2 to 1, to 3 to 1. In other words, good results may be obtained when using an amount of graphite from twice to three times the weight of the binder. This variation has been determined from a wide variety of experiments, and therefrom, I have found that for a ratio higher than 3 to 1, there is a tendency for the resultant film produced by the composition to become thixotropic or jelly-like in nature with accompanying undesirable flow properties. Moreover, the resultant film does not have the desirable degree of abrasion resistance or polishing quality.

I have also found that with ratios of less than 2 to 1, the resultant film is less resistant to abrasion than that desired. Hence, my preferred range of ratios, which I have determined results in a tenacious film which has the desired degree of abrasion resistance, is that set forth above.

The chemical or phosphoric acid content of the compound is also a very important variable and may be expressed by the ratio $$\frac{\text{grams of 100\% phosphoric acid}}{\text{grams of total solids}}$$

In the above ratio, the solids comprises the total weight in grams of the resin binder and the graphite, and I have found that the optimum values of this ratio are from .10 to .80. I have found that when this ratio is below the lower limit, the resultant films are lacking in strength and resistance to abrasion and exhibit a lack of tenacious adherence to the wear surface. The degree of polishing effect of such films is decidedly less than that desired in practice. When the ratio exceeds the higher limit, the resultant films will not dry properly, and it was found that they would tend to blister regardless of whether the treated cylinder was permitted to air dry or was baked. Within the limits prescribed, the resultant films were highly satisfactory and were sufficiently resistant to abrasion, as to give the required high degree of polishing effect.

In treating wear surfaces of cylinders with my novel composition, the cylinders are first thoroughly cleaned with a suitable solvent in order to remove any traces of oil and metal fragments which may be adhering thereto. Following this treatment, the surface is sprayed or otherwise treated with the composition, which as previously noted, is thinned to a suitable viscosity. The cylinder is next preferably allowed to dry for several hours and may then be baked at an elevated temperature, preferably from 400° to 600° F., the baking conditions being determined by the desired degree of hardness of the bond between the underlying metal and the film formed from the composition, as well as by the desired abrasion resistance to be imparted to the film.

In the treatment of steel cylinder wear surfaces which are provided with relieved areas of the type disclosed in my United States Letters Patent No. 2,434,880, issued January 20, 1948, for Cylinder surface form and character, the spray composition is applied at ordinary room temperature to a thickness of the order of from .0003" to .001" above the plateau or surface areas. It is preferred that the cylinder so treated, be allowed to dry for about five hours. In the case of relieved chromium surfaced cylinders, however, while the spraying procedure is identical to that indicated above, I prefer to allow the cylinders to air-dry for a period of about ten hours. To secure the depth of coat of the order indicated, it may be necessary to spray one or more coats upon the surface.

Following the air-drying of the treated steel cylinders, the same may be allowed to further air-dry for a total period of from seventy to eighty hours in which case the reaction between the composition and the metal of the surface will be substantially completed, and the cylinders ready for use. The additional air-drying, however, is suitable for the most part to cylinders of steel and iron only. In the case of cylinders of alloy steels, hardened materials or chromium, I have found that the stimulus of heat is necessary to bring about the chemical action which results in a suitable film. Of course, the addition of heat may also be resorted to in the case of iron and steel cylinders, and it is preferable that this be done, since I have found that from 70 to 80 hours of air drying are required to obtain approximately 90 per cent of the abrasion resistance and hardening which is accomplished by 5 to 15 hours preliminary air drying followed by baking.

When the baking step is employed after the preliminary air-drying of the cylinder surface, the latter is baked by a suitable baking operation for a time period of from 30 to 60 minutes to produce the desired abrasion resistance of the film, as well as to produce the firm, adherent bond between the film and the underlying metal.

During the process, the phosphoric acid reacts with the metal of the cylinder surface to form the phosphate of said metal in situ, with the fine graphite particles substantially uniformly dispersed throughout the film, thus effecting a firm cementing action to cause the film to be firmly and tenaciously bonded together and to the wear surface.

Cylinder wear surfaces treated by my novel composition in the manner heretofore described have exhibited remarkable properties which are not present to the same degree, in any prior cylinders of which I am aware. For example, cylinders for high output aircraft engines, treated in accordance with my invention have been free of surface disturbance, scoring or scuffing following the green and final runs thereof during time periods now used in practice. Hence, with my invention, the green or break-in period may be materially shortened since the polishing effect of the phosphate in the film insures complete compatibility of piston, and piston rings to cylinder surface within a minimum time period.

It was moreover noted that the cylinders treated in accordance with the invention herein disclosed, were completely lacquered with a thin film, over the entire ring-engaging surface, following the green and final runs referred to. Such a lacquer film is highly desirable, and while spaced lacquered areas have heretofore been achieved in certain types of cylinders, a complete lacquer film has never before been secured, so far as I am aware.

The method of treating relieved metallic wear surfaces and the product resulting therefrom is described and claimed in my copending application, Serial Number 555,377, filed September 22, 1944, for Wear surface filling.

While I have referred herein to the use of my improved composition in connection with cylinder surfaces which have been relieved, or provided with channels, scratches or depressions, it is to be understood that unrelieved cylinder surfaces may also be treated, with accompanying advantageous results and improved operating characteristics. It will also be understood that my improved composition may be employed for treating other wear surfaces subject to friction, due to relatively movable metallic elements. Therefore, it is to be understood that the invention is not to be limited other than by the terms of the claims appended hereto.

I claim:

1. A new composition of matter for treating metallic wear surfaces which are subjected to the frictional load of another wear surface to improve the load-carrying characteristics thereof and establish compatibility with the second wear surface, which consists of an emulsion of finely divided graphite, a resin binder, a solvent for the resin binder in sufficient quantity to thin the same, phosphoric acid, an emulsifier, and water in such amount as to form a water in oil emulsion, the ratio of 100% phosphoric acid to the total of binder and graphite, by weight, having a value between .10 and .80 and the ratio of graphite to binder, by weight, being between 2:1 and 3:1.

2. A new composition of matter for treating metallic wear surfaces which are subjected to the frictional load of another wear surface to improve the load-carrying characteristics thereof and establish compatibility with the second wear surface, which consists of an emulsion of the following materials in the stated proportions by weight:

| Material | Pounds | Per Cent by Weight |
|---|---|---|
| Binder | .685 | 7.78 |
| Ortho-phosphoric acid (75%) | 1.088 | 12.35 |
| Finely divided graphite | 1.565 | 17.75 |
| Solvents for binder | 3.27 | 37.09 |
| Emulsifier | .175 | 1.97 |
| Water | 2.033 | 23.06 |
| | 8.816 | 100.00 |

HARRY M. BRAMBERRY.

REFERENCES CITED

The following references are of record in the file of this patent:

UNITED STATES PATENTS

| Number | Name | Date |
|---|---|---|
| 1,792,052 | Wagner | Feb. 10, 1931 |
| 1,936,534 | Albrecht | Nov. 21, 1933 |
| 2,111,167 | Carson | Mar. 15, 1938 |
| 2,144,425 | Cook | July 17, 1939 |
| 2,191,435 | Ballard | Feb. 27, 1940 |
| 2,260,819 | Balassa | Oct. 28, 1941 |
| 2,296,070 | Thompson et al. | Sept. 15, 1942 |
| 2,296,844 | Glasson | Sept. 29, 1942 |
| 2,297,909 | Neely et al. | Oct. 6, 1942 |
| 2,302,510 | Tanner et al. | Nov. 17, 1942 |
| 2,335,958 | Parker | Dec. 7, 1943 |
| 2,341,293 | Rives | Feb. 8, 1944 |
| 2,385,800 | Douty et al. | Oct. 2, 1945 |

FOREIGN PATENTS

| Number | Country | Date |
|---|---|---|
| 3,119 | Great Britain | Oct. 27, 1869 |
| 682,467 | France | Feb. 11, 1930 |